(12) United States Patent
Sugiyama et al.

(10) Patent No.: US 6,318,883 B1
(45) Date of Patent: Nov. 20, 2001

(54) LAMP FOR VEHICLE

(75) Inventors: Fumihiko Sugiyama; Haruo Otani; Michihiko suzuki; Kazuhiro Yamazaki, all of Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 0 days.

(21) Appl. No.: 09/383,089

(22) Filed: Aug. 25, 1999

(30) Foreign Application Priority Data

Sep. 11, 1998 (JP) .................................................. 10-258545

(51) Int. Cl.$^7$ ........................................................ B60Q 1/00
(52) U.S. Cl. ............................................. 362/267; 362/507
(58) Field of Search ..................................... 362/267, 546, 362/457, 507, 310, 311; 156/344, 247, 155; 445/22, 25

(56) References Cited

U.S. PATENT DOCUMENTS

| 3,541,188 | * 11/1970 | Srail ....................................... 156/334 |
| 5,556,584 | 9/1996 | Yamazaki et al. . |
| 5,560,706 | 10/1996 | Yamazaki et al. . |

FOREIGN PATENT DOCUMENTS

| 3401437A1 | 7/1984 | (DE) ................................ F21M/7/00 |
| 3431032A1 | 3/1986 | (DE) ................................ F21M/3/00 |
| 2033069 A | 5/1980 | (GB) . |

* cited by examiner

Primary Examiner—Y. Quach
(74) Attorney, Agent, or Firm—Fish & Richardson, P.C.

(57) ABSTRACT

A lamp for a vehicle is described that incorporates a lamp body to which a front lens is joined by a sealing member. The sealing member is made of a low-adhesive hot melt in the gel state which causes surface exfoliation when the front lens is separated from the lamp body. This makes it possible to easily attach or detach the front lens and prevent the front lens, the lamp body, and the sealing member from being damaged during a separating operation. Since the elastic repulsion force of the sealing member is small, threaded fasteners are not required for fastening the front lens to the lamp body. Instead, only hook fasteners need be used. Therefore, the structure of the lamp is simplified and the workability in the process for assembling the lamp is improved.

9 Claims, 6 Drawing Sheets

FIG. 4-(a)
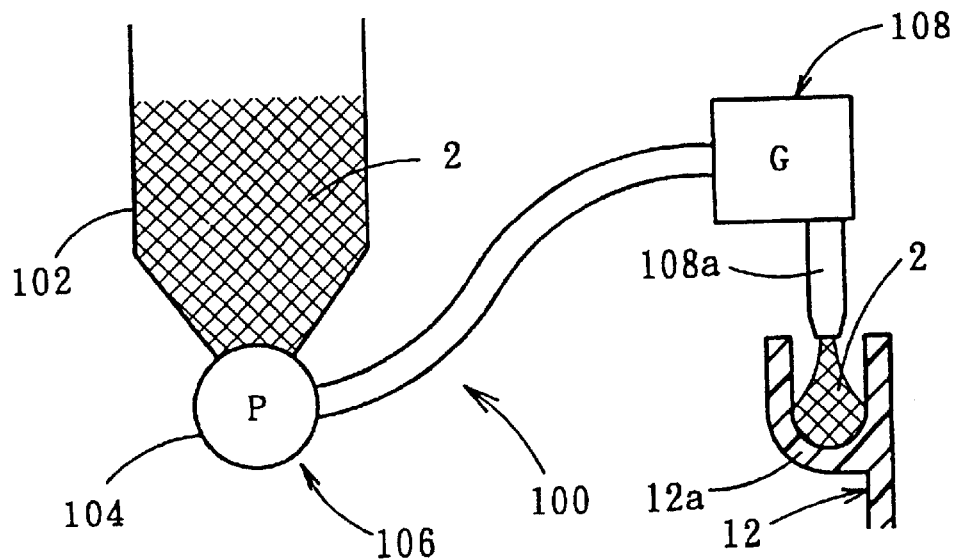
FIG. 4-(b)
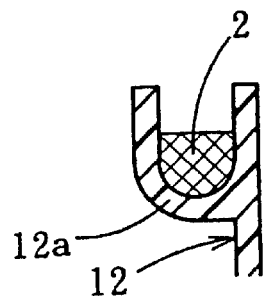
FIG. 4-(c)
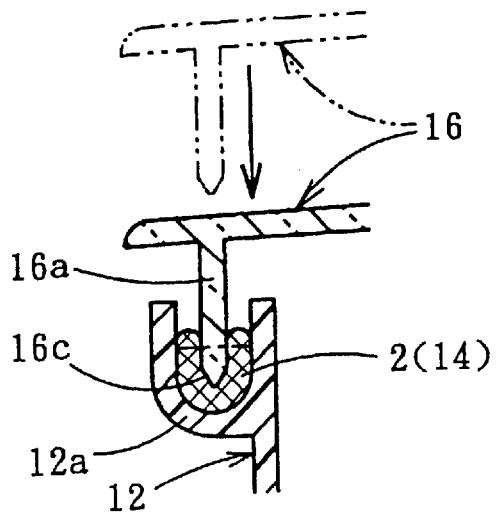

FIG. 7-(a) PRIOR ART
FIG. 7-(b) PRIOR ART
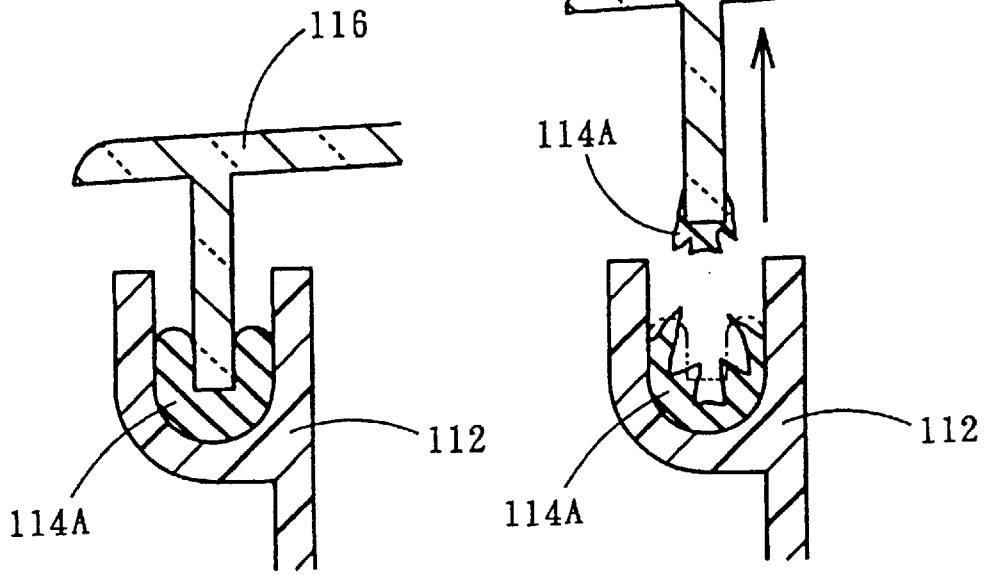
FIG. 8-(a) PRIOR ART
FIG. 8-(b) PRIOR ART
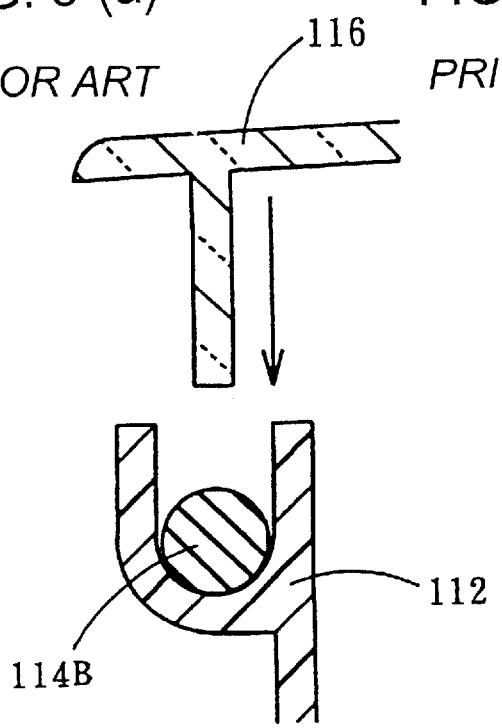
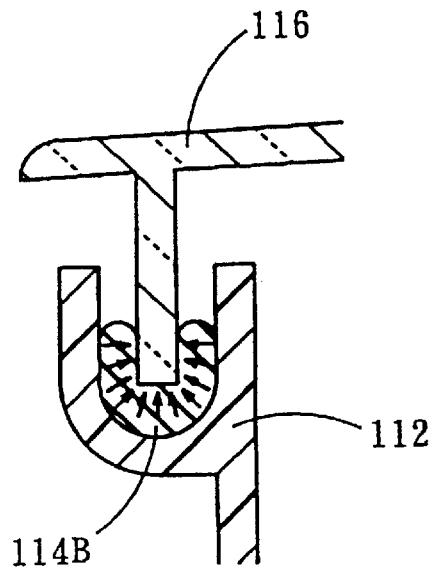

FIG. 9-(a) PRIOR ART
FIG. 9-(b) PRIOR ART
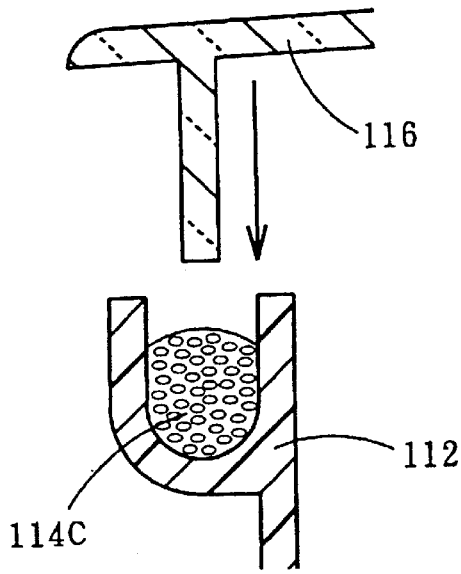
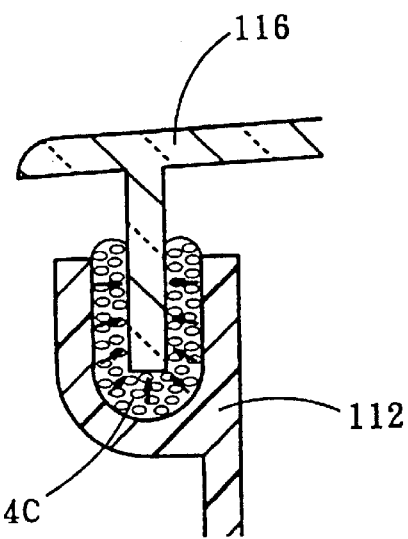
FIG. 10
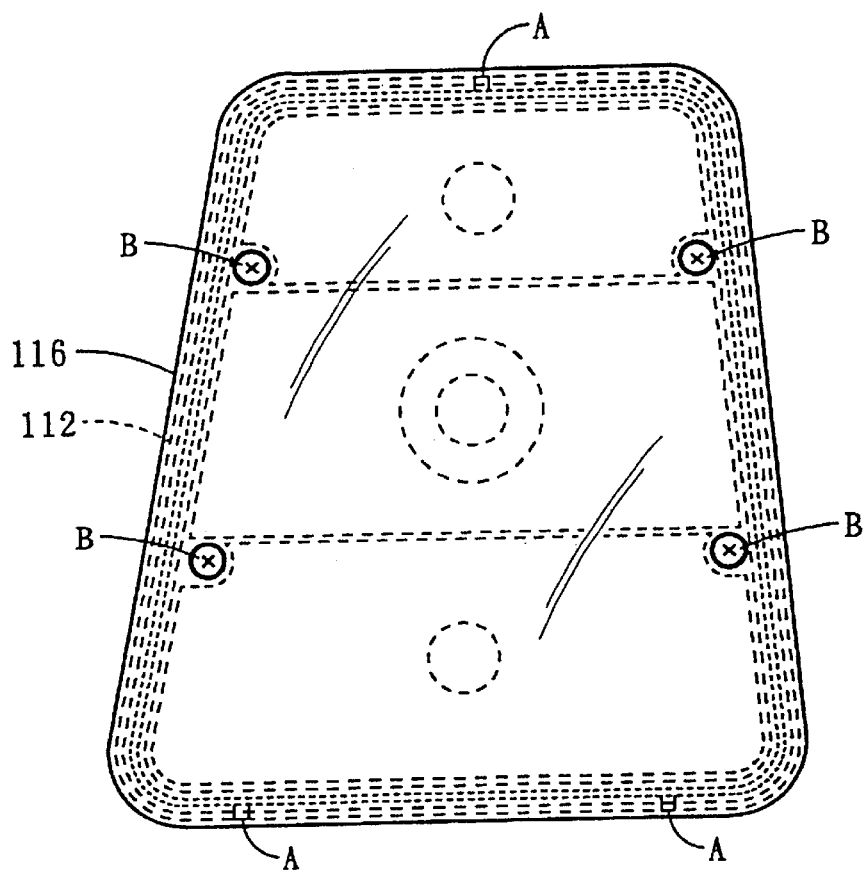

LAMP FOR VEHICLE

BACKGROUND OF THE INVENTION

1. Field of the Invention

The present invention relates to a lamp for vehicle, and more particularly, to a structure for sealing a space between a front lens and a lamp body of the lamp for the vehicle.

2. Prior Art

In general, a lamp for a vehicle is structured such that when joining a front lens to the lamp body, a sealing member is interposed therebetween to maintain a required sealing efficiency between the lamp body and the front lens so as to prevent introduction of water, dust or the like into the interior of the lamp.

Hitherto, as the sealing member, a hot melt 114A as shown in FIG. 7(a), an elastic cord 114B as shown in FIG. 8(b), and a foamed gasket 114C as shown in FIG. 9(b) have been known.

The hot melt 114A is a thermoplastic adhesive having great adhesive strength and generating no repulsion force. Therefore, when a front lens 116 is secured to a lamp body 112, a strong mechanical joining, for example, by using threaded fasteners such as screws, is not required. That is, the hot melt 114A has an advantage that allows the usage of only engagement fastening as an effective means of mechanical joining. There, however, arises the following problem when the components of the lamp are intended to be recycled. That is, the hot melt 114A having the great adhesive strength inhibits easy separation of the front lens 116 from the lamp body 112. If the separation is forcibly performed, a cohesion failure (a phenomenon in which the structure of the hot melt 114A is torn along random surfaces of breakage) occurs as shown in FIG. 7(b). Therefore, not only the hot melt 114A encounters cohesion failure, but also the lamp body 112, and a front lens 116 to which a chip of the hot melt 114A is still adhered cannot be recycled.

Regarding FIGS. 8(a) and 9(a), the elastic cord 114B and the foamed gasket 114C are made of a thermosetting elastic material having no tackiness. Therefore, the front lens 116 can be attached to or detached from the lamp body 112 without elastic cord residue, allowing recycling of the lamp components. However, each of the elastic cord 114B and the foamed gasket 114C yields a great elastic repulsion force so as to maintain sealing efficiency. Therefore, as shown in FIGS. 8(b) and 9(b), the repulsion force constantly acts on the front lens 116 so as to be forced out. Therefore, simple fastening means such as engagement fasteners are insufficient as the mechanical fastening means for securing the front lens 116 to the lamp body 112. Thus, strong fastening means such as threaded fasteners have to be additionally used as shown in FIG. 10 (referring to the drawing, the symbol A represents engagement fastening portions and B represents threaded fasteners). As a result, the structure of the lamp becomes too complicated to improve workability in the process for assembling the lamp. In these foregoing cases, the elastic repulsion force also frequently causes failure such as deformation or a fracture of the front lens 116.

Since the elastic cord 114B is a complete product serving as the elastic sealing member, it is difficult to apply the elastic cord 114B automatically to the sealing position on the lamp body 112. Therefore, the elastic cord 114B is applied by performing a manual bonding operation. As a result, there arises a problem of deteriorated workability in the process for assembling the lamp. As for the foamed gasket 114C, the foamed gasket material can be automatically applied to the sealing position on the lamp body 112. However, hardening of the applied foamed gasket material takes a long time. Also in this case, there arises the problem of deteriorated workability in the process for assembling the lamp.

SUMMARY OF THE INVENTION

In view of the foregoing, the present invention provides a lamp for a vehicle which incorporates a lamp body to which a front lens is joined through a sealing member so as to allow the front lens to be attached or cleanly detached, simplifies the structure of the lamp, and improves the workability in the process for assembling the lamp.

The present invention achieves the foregoing by improving the structure of the sealing member. That is, according to the present invention, there is provided a lamp for a vehicle having a lamp body to which a front lens is joined through a sealing member, wherein the sealing member is made of a low-adhesive hot melt in the gel state that causes surface exfoliation when the front lens is separated from the lamp body.

The expression "surface exfoliation" means the phenomenon in which the sealing member exfoliates at an interface with the front lens or the lamp body without causing cohesion failure.

The phrase "low-adhesive hot melt in the gel state", means a thermoplastic adhesive similar to the usual hot melt, structured so as to maintain a low-adhesive gel state even when it is used as the sealing member. In order to obtain the foregoing property, the content of wax and so forth as the cause of the cohesion failure is reduced so that it is less than that of the usual hot melt. Further, an appropriate amount of plasticizer or the like may be added.

The expression "low-adhesive" means an adhesive strength that is low enough to allow the sealing member to cause surface exfoliation when the front lens is separated from the lamp body.

To realize the low-adhesive property, a structure is employed in which a separating force El required to separate the front lens from the lamp body satisfies a range of $0<F1 \leq 1$ kg/cm$^2$. It is preferable that the sealing member yields a certain level of tackiness to improve sealing efficiency. Additionally, it is preferable to reduce the separating force in order to simplify the operation of removing the front lens from the lamp body. Therefore, it is preferable to reduce the range of the separating force F1. For example, a suitable structure for use as a sealing member satisfies the range of $0.05 \leq F1 \leq 0.5$ kg/cm$^2$. Preferably, the structure for use as a sealing member satisfies the range of $0.1 \leq F1 \leq 0.3$ kg/cm$^2$. According to the foregoing structure, the present invention has the structure in which the sealing member interposed between the front lens and the lamp body is made of a low-adhesive hot melt in the gel state which causes surface exfoliation when the front lens is separated from the lamp body. Therefore, the structure not only allows easy removal of the front lens from the lamp body, but also prevents the front lens, the lamp body and the sealing member from being damaged. As a result, the components of the lamp can effectively be recycled.

Since the sealing member is made of a low-adhesive hot melt in the gel state, it yields a certain level of elasticity. Unlike the sealing member formed as an elastic cord or a foamed gasket which depend on their elastic repulsion force, the aforementioned sealing member is capable of maintaining sealing efficiency between the front lens and the lamp body with its own adhesive strength. Therefore, the sealing member does not have to be strongly depressed. Accordingly, the mechanical fastening means for securing the front lens to the lamp body may be a simple fastening means, such as a hook fastening means. Thus, strong fastening means such as threaded fasteners such as screws do not have to be used, resulting in a simplified structure of the lamp and improved workability in the process for assembling the lamp. Moreover, the present invention prevents such failures as deformation or a fracture of the front lens which may occur due to elastic repulsion force.

The sealing member, which is made of a low-adhesive hot melt, can automatically be applied to a sealing position on the lamp body (or on the front lens). Moreover, only a substantially short time is required for cooling the sealing member at the sealing position into the low-adhesive hot melt in the gel state as compared with the time required for hardening a foamed gasket. Thus, workability in the process for assembling the lamp can also be improved.

As described above, the lamp for a vehicle incorporating the front lens joined to the lamp body through the sealing member allows the front lens to be attached or detached such that the structure of the lamp is simplified and the workability in the process for assembling the lamp is improved.

In the structure of the present invention, since the sealing member is formed as the low-adhesive hot melt in the gel state, it yields a certain degree of elasticity as described above. It is preferable to select a base polymer and add the plasticizer such that the amount of the elastic repulsion force does not become unnecessarily large. That is, it is preferable to reduce the elastic repulsion force to a degree that allows the use of engagement fastening means as the mechanical fastener for securing the front lens to the lamp body, and eliminates the need to use additional threaded fasteners or the like. In order to realize this, an elastic repulsion force F2 of the sealing member may be set to satisfy the range of $0<F2 \leqq 1$ kg/cm$^2$. From the viewpoint of improving workability in the process for assembling the lamp, it is preferable to reduce the elastic repulsion force of the sealing member to be as small as possible. Therefore, it is desirable to minimize the elastic repulsion force F2. For example, the value of the elastic repulsion force may be set so as to satisfy the range of $0<F2 \leqq 0.5$ kg/cm$^2$. Further, it may be preferable to set the value so as to satisfy the range of $0<F2 \leqq 0.3$ kg/cm$^2$.

Referring to the drawings, an embodiment of the present invention will be hereinafter described.

BRIEF DESCRIPTION OF THE DRAWINGS

FIG. 4 is a diagram showing a process according to the invention for joining a front lens to a lamp body of the lamp for a vehicle.

FIGS. 7(a) and 7(b) are detailed cross sectional views showing a portion of a conventional lamp for a vehicle to illustrate cohesion failure.

FIGS. 8(a) and 8(b) are detailed cross sectional views showing a portion of a conventional lamp for a vehicle to illustrate the use of elastic cord.

FIGS. 9(a) and 9(b) are detailed cross sectional views showing a portion of a conventional lamp for a vehicle to illustrate the use of a foamed gasket.

FIG. 10 is a front view showing a conventional lamp for a vehicle.

DETAILED DESCRIPTION

Figure 1:
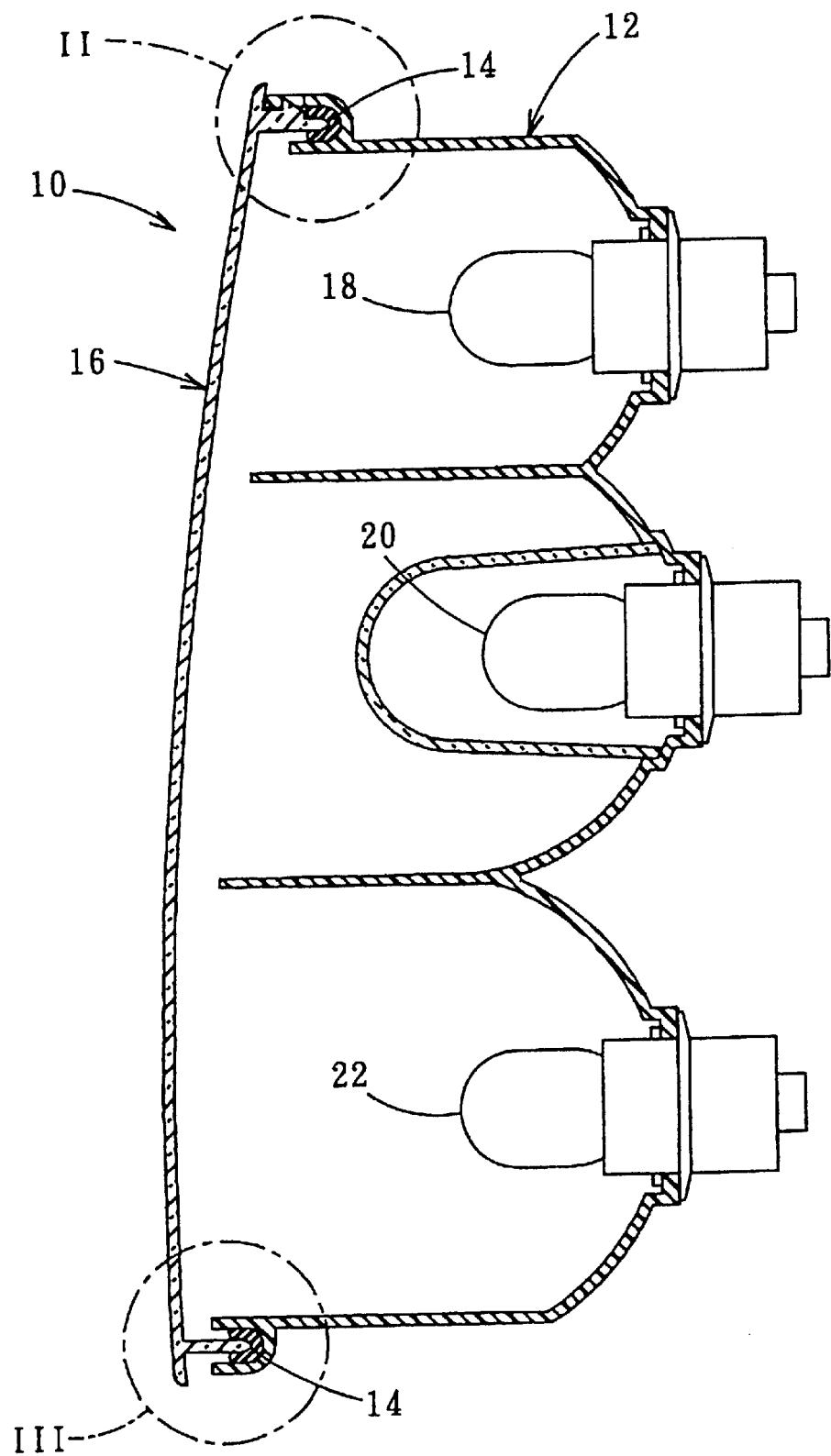
FIG. 1 is a sectional side elevation showing a lamp for a vehicle according to an embodiment of the present invention.
Figure 2:
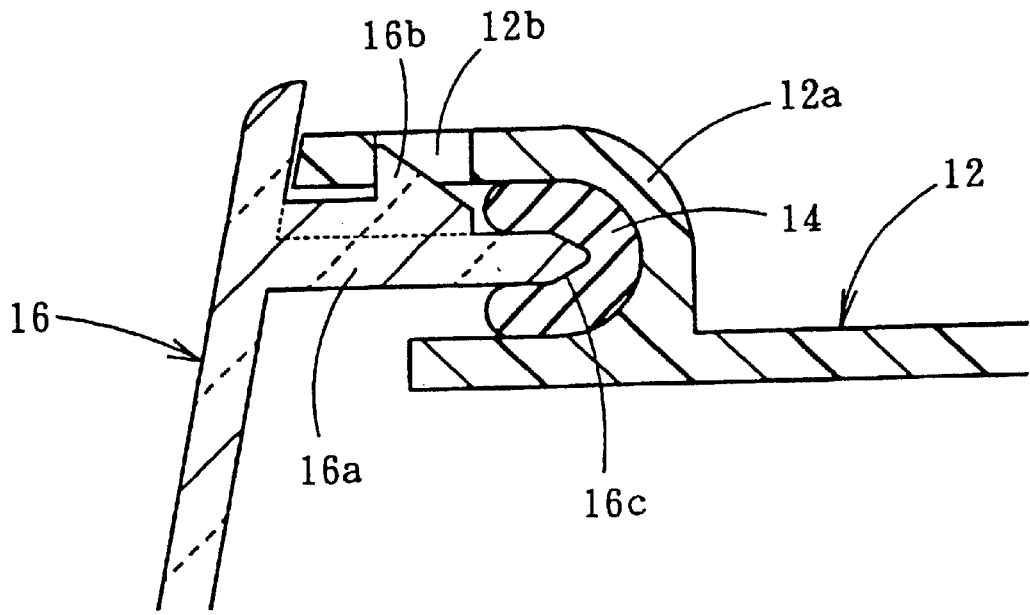
FIG. 2 is a detailed diagram representing a portion II shown in FIG. 1.
Figure 3:
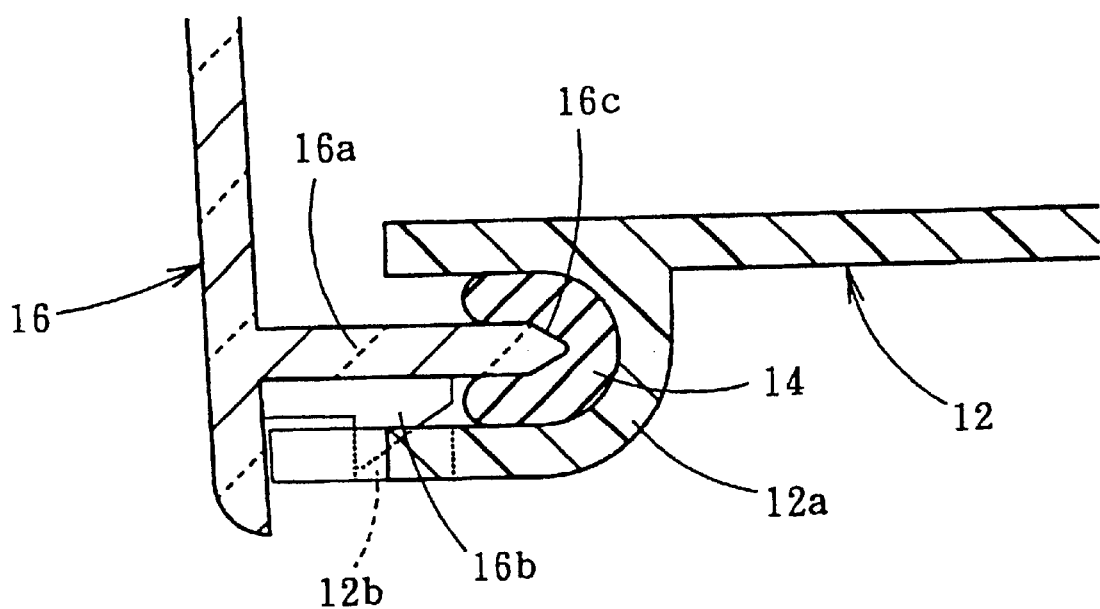
FIG. 3 is a detailed diagram representing a portion III shown in FIG. 1.

FIG. 1 is a sectional side elevation showing a lamp for vehicle according to an embodiment of the present invention. FIGS. 2 and 3 are diagrams showing portions II and III in detail, respectively.

As shown in FIG. 1, a lamp 10 for a vehicle according to the present invention is a rear combination lamp for an automobile. The lamp 10 has three lamp chambers vertically aligned, which is defined by a lamp body 12 and a front lens 16 joined thereto through a sealing member 14. The lamp chambers have light-source bulbs 18, 20 and 22, respectively. As shown in FIGS. 2 and 3, a sealing groove 12a having a generally U-shaped cross section is formed at an outer peripheral edge of a front opening of the lamp body 12. A sealing leg 16a which can be inserted into the sealing groove 12a is formed at the outer peripheral edge of the back surface of the front lens 16. The front lens 16 is joined to the lamp body 12 by inserting the sealing leg 16a (having a tapered leading end 16c) of the front lens 16 into the sealing groove 12a in a state where the sealing member 14 is disposed in the sealing groove 12a of the lamp body 12.

A plurality of engagement means or hook fasteners 16b are formed on the outer surface of the sealing leg 16a of the front lens 16. Furthermore, hook engaging holes 12b are formed at positions opposing the corresponding hook fasteners 16b in the outer wall of the sealing groove 12a of the lamp body 12. When joining the front lens 16 to the lamp body 12, the hook fasteners 16b are brought into engagement with the hook engaging holes 12b, respectively.

The sealing member 14 is made of a low-adhesive hot melt in the gel state and arranged to be automatically supplied into the sealing groove 12a of the lamp body 12 by an automatic supply apparatus to be described later.

The low-adhesive hot melt is prepared by adding a tackifier formed of a petroleum resin or the like, a wax such as polypropylene, an oxidation inhibitor, a pigment, and a plasticizer made of low molecular weight polymer or the like to a base polymer, for example, styrene thermoplastic elastomer (SEBS) or a butyl rubber.

The base polymer is used to obtain the rubber elasticity, the tackifier is used to obtain tackiness, the wax is used to lower the viscosity when performing a heating process for melting the hot melt, the oxidation inhibitor is used to prevent deterioration, and the pigment is used to perform coloring. The foregoing ingredients are contained in the usual hot melt. The base polymer has unsatisfactory flowability. The wax becomes brittle after being solidified, resulting in the cohesion failure. Therefore, compared with the usual hot melt, the wax content of the hot melt of the present invention is reduced and the plasticizer is added so as to improve the flowability. For example, the wax content of the usual hot melt ranges from about 10% to about 50%. On the contrary, the wax content of the foregoing low-adhesive hot melt ranges from about 0% to about 20%. As for the plasticizer to be added, the content may be set to about 20% or less.

Figure 5:
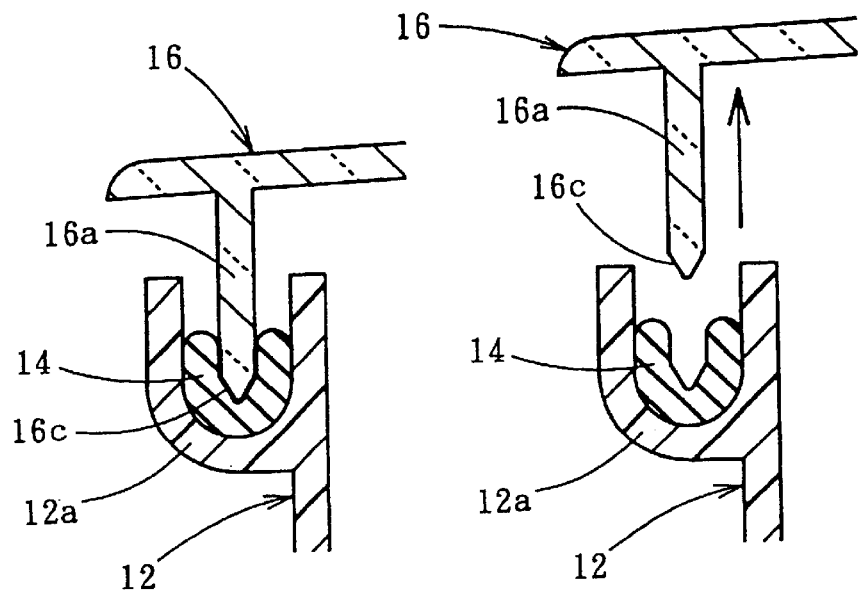
FIG. 5 is a detailed cross sectional view of a portion of the lamp for a vehicle in a state where the front lens is separated from the lamp body to illustrate exfoliation.

As a result of employing the foregoing composition, the low-adhesive hot melt in the gel state can be obtained as the sealing member 14. Thus, as shown in FIG. 5, surface exfoliation can be generated between the sealing member 14 and the front lens 16 when separating the front lens 16 from the lamp body 12. Furthermore, a separating force F1 required to separate the front lens 16 from the lamp body 12 can be set to be small enough to satisfy the range of 0.1 kg/cm² ≦ F1 ≦ 0.3 kg/cm².

FIG. 4 is a diagram showing the procedure for joining the front lens 16 to the lamp body 12.

As shown in FIG. 4(a), an automatic supply apparatus 100 automatically supplies the low-adhesive hot melt in a molten state into the sealing groove 12a of the lamp body 12. The automatic supply apparatus 100 incorporates a tank 102 for heating and melting the low-adhesive hot melt 2, an applicator 106 including a pump 104, and a hot-melt gun 108 connected to the applicator 106. The low-adhesive hot melt 2 in the molten state supplied from the applicator 106 is supplied into the sealing groove 12a of the lamp body 12 through a nozzle 108a of the hot-melt gun 108.

Then, as shown in FIG. 4(b), in a state where the low-adhesive hot melt 2 has been supplied into the sealing groove 12a of the lamp body 12, the lamp body 12 is allowed to stand until the low-adhesive hot melt 2 that has been heated at about 230° C. is cooled at about 40° C. so as to be gelled. The foregoing cooling process takes about 2 to 5 minutes.

Figure 6:
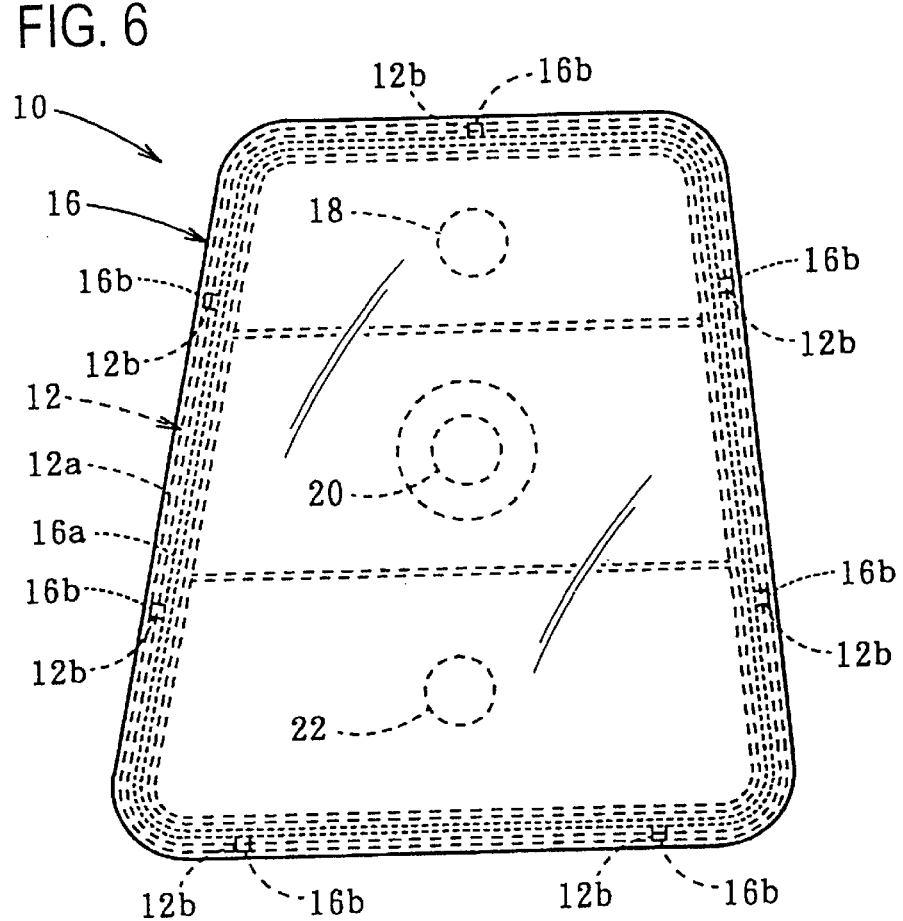
FIG. 6 is a front view showing the aforementioned lamp for a vehicle.

Then, as shown in FIG. 4(c), the sealing leg 16a of the front lens 16 is inserted into the sealing groove 12a of the lamp body 12 such that the front lens 16 is joined to the lamp body 12. At this time, as shown in FIG. 6, the hook fasteners 16b of the front lens 16 are engaged with the corresponding hook engaging holes 12b of the lamp body 12 at a plurality of positions (seven) at the outer peripheral edge of the lamp body 12. Thus, the front lens is mechanically fastened to the lamp body. Since the leading end 16c of the sealing leg 16a is formed into the tapered shape, the resistance exerted from the low-adhesive hot melt 2 to the sealing leg 16a can significantly be reduced when inserting the sealing leg 16a into the sealing groove 12a.

During the foregoing joining operation, the low-adhesive hot melt 2, in the sealing groove 12a, spreads along the sealing leg 16a. Then, the low-adhesive hot melt 2 in the gel state adheres to the sealing groove 12a and the sealing leg 16a with a small adhesive strength. As a result, the low-adhesive hot melt 2 serves as the sealing member 14 for sealing the space between the front lens 16 and the lamp body 12.

As described above, according to this embodiment, the sealing member 14 interposed between the front lens 16 and the lamp body 12 is made of the low-adhesive hot melt 2 in the gel state which causes surface exfoliation when separating the front lens 16 from the lamp body 12. Therefore, the front lens 16 can easily be removed from the lamp body 12. Moreover, the front lens 16, the lamp body 12 and the sealing member 14 can be prevented from being damaged during the separating process. Therefore, the components of the lamp can be effectively recycled.

Since the sealing member 14 is constituted by the low-adhesive hot melt 2 in the gel state, it yields a certain degree of elasticity as described above. However, the elastic repulsion force of the low-adhesive hot melt 2 in the gel state becomes substantially small (in the case of the foregoing composition, the elastic repulsion force will be about 0.3 kg/cm²). Therefore, in spite of employing only hook fasteners as the mechanical fastening means between the lamp body 12 and the front lens 16, the front lens 16 can be reliably secured to the lamp body 12. Addition of strong fastening means, such as threaded fasteners, is not required as the mechanical fastening means for securing the front lens 16 to the lamp body 12. Therefore, the structure of the lamp can be simplified. Moreover, the workability in the process for assembling the lamp can be improved. Furthermore, the appearance of the lamp can be improved as compared with the conventional structure in which threaded fasteners are used as shown in FIG. 10. In addition, such failures as deformation and fractures of the front lens 16 caused by the elastic repulsion forces can be prevented.

Since the sealing member 14 is made of the low-adhesive hot melt 2, it can be automatically applied to the sealing position on the lamp body 12 in a manner similar to applying the usual hot melt. Moreover, the time required to cool the sealing member 14 into the low-adhesive hot melt 2 in the gel state at the sealing position can be significantly shortened as compared with the time required to harden the foamed gasket. Also from the foregoing viewpoint, the workability in the process for assembling the lamp can be improved.

As described above, according to this embodiment, the lamp 10 for a vehicle incorporating the lamp body 12 to which the front lens 16 is joined through the sealing member 14 allows the front lens 16 to be safely attached or detached, simplifies the structure of the lamp, and improves the workability in the process for assembling the lamp.

The lamp 10 for a vehicle according to this embodiment is structured such that the sealing leg 16a of the front lens 16 is inserted into the sealing groove 12a of the lamp body 12 so as to join the front lens 16 to the lamp body 12. Therefore, when separating the front lens 16 from the lamp body 12, surface exfoliation of the sealing member 14 occurs from the front lens 16 which has a small contact area with the sealing member 14 as compared with the lamp body 12. Therefore, surface exfoliation of the sealing member 14 from the lamp body 12 may occasionally occur depending on the structure for sealing the space between the lamp body 12 and the front lens 16.

An embodiment has been described with a structure in which the mechanical fastening means between the lamp body 12 and the front lens 16 is performed by hook fasteners. It can be clearly understood that other simple fastening means may be employed to perform mechanical fastening.

In the described embodiment, the lamp 10 for a vehicle is a rear combination lamp. However, other types of lamps for a vehicle may be employed as long as the lamp has a structure in which the front lens 16 is joined to the lamp body 12 through a sealing member 14. Therefore, employment of the structure according to the described embodiment with other lamp types attains similar operation and effects.

What is claimed is:

1. A lamp for a vehicle, comprising:
    a lamp body;
    a sealing member made of a low-adhesive hot melt in a gel state; and
    a front lens joined to the lamp body by the sealing member,
    wherein when the front lens is separated from the lamp body, the low adhesive hot melt does not tear and adhere to the front lens.

2. The lamp of claim 1, further comprising at least one engagement fastening means for securing the front lens to the lamp body.

3. The lamp of claim 2, wherein the engagement fastening means are hook fasteners.

4. The lamp of claim 1, wherein the low-adhesive hot melt comprises a base polymer, a tackifier, about 20% or less of wax, about 20% or less of plasticizer, and an oxidation inhibitor.

5. The lamp of claim 1, further comprising the front lens having a sealing leg and a tapered-shape end of the sealing leg.

6. A lamp for a vehicle, comprising:

a lamp body;

a sealing member comprising a low-adhesive hot melt in a gel state; and a front lens joined to the lamp body by the low-adhesive hot melt;

wherein a separating force F1 required to separate the front lens from the lamp body satisfies a range of $0<F1\leq 1$ kg/cm$^2$ such that low adhesive hot melt does not tear and adhere to the front lens when the front lens is separated from the lamp body by said separating force.

7. A lamp for a vehicle, comprising:

a lamp body;

a sealing member comprising a low-adhesive hot melt in a gel state; and a front lens joined to the lamp body by the low-adhesive hot melt;

wherein an elastic repulsion force F2 of the sealing member satisfies a range of $0<F2\leq 1$ kg/cm$^2$ such that low-adhesive hot melt does not tear and adhere to the front lens when the front lens is separated from the lamp body.

8. A lamp for a vehicle, comprising:

a lamp body;

a sealing member made of a low-adhesive hot melt in a gel state comprising about 20% or less of wax and about 20% or less of plasticizer; and a front lens joined to the lamp body by the sealing member, wherein when the front lens is separated from the lamp body, the low adhesive hot melt does not tear and adhere to the front lens.

9. The lamp of claim 1, wherein the low-adhesive hot melt further comprises a base polymer, a tackifier, and an oxidation inhibitor.

* * * * *